May 27, 1952  F. W. SCHALLER  2,597,954
EARTHWORKING IMPLEMENT
Filed Jan. 6, 1949
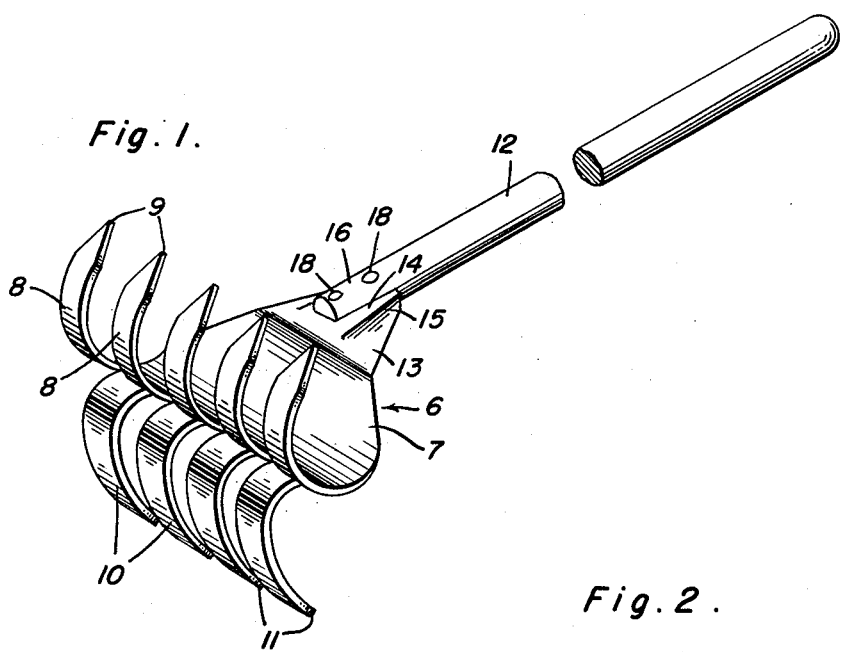
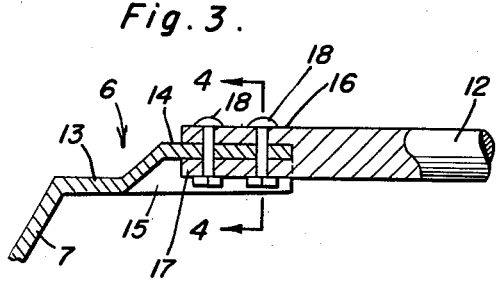
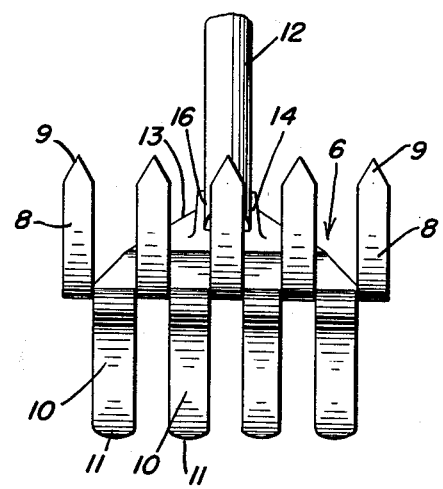
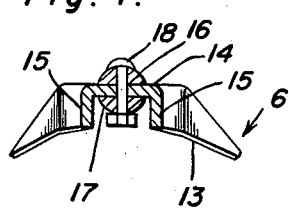
Fred W. Schaller
INVENTOR.

Patented May 27, 1952

2,597,954

UNITED STATES PATENT OFFICE 2,597,954

EARTHWORKING IMPLEMENT

Fred W. Schaller, Jenera, Ohio

Application January 6, 1949, Serial No. 69,555

1 Claim. (Cl. 97—71)

The present invention relates to garden implements and tools of the manually usable home garden variety and, more in particular, has reference to an earth working and cultivating tool characterized by a unique head possessed of facilities for effectively handling many and varied planting and gardening chores.

An object of the invention has to do with the forming and styling of a distinctive head from a single plate of metal wherein one edge portion of the plate is fashioned into a series of tines or teeth and an opposite edge is fashioned to provide an effective ways and means whereby the bifurcated end of a handle may be securely and reliably bolted to said head.

Another object of the invention has to do with an arrangement of the aforementioned construction in which the tines are disposed in separate sets and directed in opposite positions with some of the tines pointed to provide novel cultivating teeth and the other tines blunt-ended that they may serve for breaking clods, smoothing soil and otherwise kneading the soil or perhaps used for raking debris from beneath and around plants and flowers.

Other objects and advantages will become more readily apparent from the following description and the accompanying illustrative drawings:

In the drawings, wherein like numerals are employed to designate like parts throughout the views:

Figure 1 is a perspective view of an implement constructed in accordance with the principles of the present invention, Figure 2 is a front end elevation of said implement, Figure 3 is a fragmentary sectional view taken somewhat centrally in a line with the handle and showing certain of the important details of construction, and Figure 4 is a cross section on the line 4—4 of Figure 3, looking in the direction of the arrows.

Referring now to the drawings by distinguishing reference numerals, the one-piece sheet metal head is denoted by the numeral 6 and comprises a metal plate triangular in shape as at 7. The left-hand edge of the plate is provided with a plurality of slits and the slits serve to define a series of fingers or tines. The fingers are alternately bent in directions at approximate right angles to the plate proper and said fingers are longitudinally curved. There are two sets of fingers in alternate relationships and the fingers or tines at the top in Figure 1 are denoted by the numerals 8 and these have their free ends pointed or sharpened, as at 9, for digging and other ground-working and cultivating purposes. The complemental fingers are also curved and are denoted by the numerals 10. The free ends of these fingers 10 are rounded off and may be described as blunt-ended, as at 11. The opposite edge portion of the plate which attaches to the handle 12 is reduced in width and of general triangular form, as at 13. This has its apex portion fashioned into a sort of a channel with the web (see Figure 4) 14 providing a shank and with the side walls providing reinforcing and stabilizing webs 15. The channeled formation serves to reinforce this edge portion of the plate and adapts same for satisfactory connection with the handle. In fact, the handle is bifurcated and the furcations 16 and 17 straddle the web or shank 14 and the furcation 17 is confined in the channelway. Bolts or rivets 18 serve to join the furcations with the web, thus providing an effective joint and reliable connection of parts.

So far as I have been able to ascertain after an extended survey of the prior field of invention and the prior art, it is novel to take a flat plate of suitable gauge metal and to stamp same out and then cut and fashion it into the adaptation shown in the drawings. That is to say, novelty is predicated upon a plate, one edge portion of which is somewhat triangular in form and fashioned into a channel to provide an effective ways and means of joining same with a bifurcated handle. In addition, novelty is based on the slitted opposite edge portion of the plate with the prongs or tines bent in opposite directions with some pointed and others rounded into blunt formation.

It is a matter of common knowledge that rakes, digging implements, so-called pointed tine cultivators and so on and so forth are used in many and different ways. It is not always practical for the inventor to attempt to anticipate the various uses to which the implement or tool will be put. It is evident, however, that ordinarily the user would employ the pointed tines for digging and cultivating and turning of soil in and around trees, plants and flowers. The other tines facing in the opposite direction would ordinarily be used for raking, and perhaps for breaking up lumps and doing other jobs that rakes would be employed for.

Experience in choice and selection of tools in this art for intended purposes will enable purchasers to utilize the tool in such ways as they find the same satisfactorily usable in and around home gardens.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

As a new article of manufacture, a tool head embodying a substantially triangular plate the apex end of which is adapted for attachment to a handle, the basal edge of said plate being slitted and defining a plurality of fingers constituting tines, the alternating tines being bent in opposite directions in respect to the body portion of the plate and all of said tines being curvilinear, certain of said tines having blunt free ends and other tines having sharpened free ends, all of the blunt ends being on one side of said plate and all of the sharp ends being on an opposite side of said plate, all of said tines being of corresponding curvatures and of corresponding lengths.

FRED W. SCHALLER.

REFERENCES CITED

The following references are of record in the file of this patent:

UNITED STATES PATENTS

| Number | Name | Date |
|---|---|---|
| 51,893 | Eaton | Jan. 2, 1866 |
| 1,204,332 | Archer | Nov. 7, 1916 |
| 1,232,832 | Newell | July 10, 1917 |
| 1,261,638 | Southwell | Apr. 2, 1918 |

FOREIGN PATENTS

| Number | Country | Date |
|---|---|---|
| 2,213 | Australia | May 21, 1931 |
| 26,435 | Denmark | Aug. 16, 1920 |
| 123,984 | Switzerland | Mar. 16, 1928 |